(12) United States Patent
Streid

(10) Patent No.: US 8,573,977 B2
(45) Date of Patent: Nov. 5, 2013

(54) GENERATING IMAGES FOR DETECTION BY NIGHT VISION DEVICES

(75) Inventor: Harold R. Streid, Ladue, MO (US)

(73) Assignee: The Boeing Company, Chicago, IL (US)

(*) Notice: Subject to any disclaimer, the term of this patent is extended or adjusted under 35 U.S.C. 154(b) by 157 days.

(21) Appl. No.: 13/158,658

(22) Filed: Jun. 13, 2011

(65) Prior Publication Data
US 2012/0315603 A1     Dec. 13, 2012

(51) Int. Cl.
*G09B 19/16* (2006.01)

(52) U.S. Cl.
USPC ................................. 434/36; 434/38; 434/44

(58) Field of Classification Search
USPC ......... 434/36, 41; 359/618, 630, 634; 353/31; 348/121–124
See application file for complete search history.

(56) References Cited

U.S. PATENT DOCUMENTS

| | | | | |
|---|---|---|---|---|
| 4,016,658 A * | 4/1977 | Porter et al. | ..................... | 434/41 |
| 4,202,601 A | 5/1980 | Burbo et al. | | |
| 4,203,232 A | 5/1980 | Knight et al. | | |
| 5,192,208 A | 3/1993 | Ferguson et al. | | |
| 5,380,204 A * | 1/1995 | Decker | ........................... | 434/36 |
| 6,196,845 B1 | 3/2001 | Streid | | |
| 6,780,015 B2 | 8/2004 | Swaine et al. | | |
| 7,663,795 B2 | 2/2010 | Blackham | | |
| 8,089,693 B2 * | 1/2012 | Lin et al. | .................. | 359/491.01 |
| 2005/0029456 A1 * | 2/2005 | Eggers et al. | ............ | 250/339.02 |
| 2009/0201430 A1 | 8/2009 | Streid et al. | | |
| 2010/0110308 A1 * | 5/2010 | Nicholson et al. | ............ | 348/744 |
| 2012/0140099 A1 | 6/2012 | Kim et al. | | |

OTHER PUBLICATIONS

UK Search and Examination Report, Dated Nov. 14, 2012, UK Intellectual Property Office, Application No. GB1210537.5, 5 pgs.
Burggraf et al., High Level Vis-IR Stimulated NVG Training, Proceedings of the IMAGE 2009 Conference; St. Louis, MO, Jul. 2009, (7 pgs).

* cited by examiner

*Primary Examiner* — Timothy Musselman
*Assistant Examiner* — Elroy S Crocker
(74) *Attorney, Agent, or Firm* — Toler Law Group, PC

(57) ABSTRACT

Methods, apparatuses, and flight simulators are disclosed to present infrared images detectable by night vision devices. A video signal may be received. The video signal may be configured to generate a viewable image substantially within a human visible spectrum. The video signal may include one or more of a red component, a green component, and a blue component. The video signal also may be configured to generate one or more infrared images. The one or more infrared images may be substantially outside the human visible spectrum and may have an infrared component detectable by a night vision device. In response to the video signal, the red and green components may be separately modulated to generate red and green portions of the viewable image. The blue component and the infrared component may be collectively modulated to generate a blue portion of the viewable image and the one or more infrared images.

20 Claims, 6 Drawing Sheets

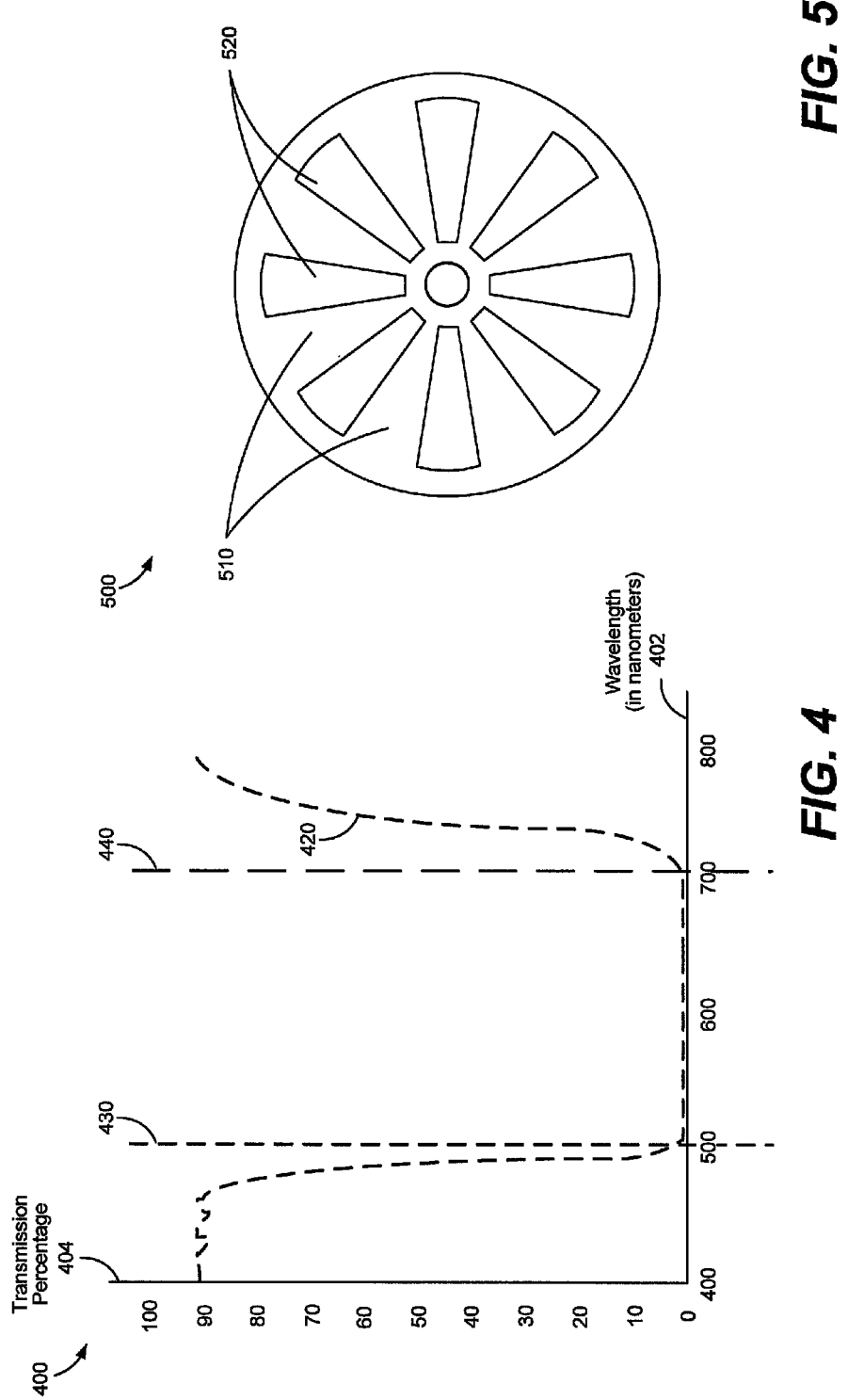

GENERATING IMAGES FOR DETECTION BY NIGHT VISION DEVICES

FIELD OF THE DISCLOSURE

The present disclosure is generally related to projecting images.

BACKGROUND

Flight training simulators may include one or more display screens and simulated controls. The display screens may simulate a scene that may be viewed when piloting an aircraft. In response to inputs at the simulated controls, a control system changes the perspective of the scene to simulate movement of the simulated aircraft in response to the inputs.

For some types of flight training, such as military flight training, it may be useful to simulate night missions in which a pilot may wear night vision goggles (NVGs) in order to identify targets or objects of interest. NVGs or other night vision devices are designed to have high sensitivity in the near-infrared (near-IR) portion of the spectrum. This is because naturally-occurring illumination provided by a night sky includes predominantly near-IR light. Infrared light images can be difficult to simulate using standard projectors without also displaying the objects in a human visible spectrum. When the objects are detectable in the human visible light spectrum, a pilot trainee may detect the infrared light objects by peeking around the edges of the NVGs or with the NVGs moved out of position. Being able to detect the infrared light objects without the aid of the NVGs may make the simulation of the night mission less realistic and, thus, may make the simulation somewhat less valuable.

SUMMARY

Methods, apparatuses, and flight simulators are disclosed to present infrared images that are detectable by night vision devices but that are substantially outside a human visible spectrum. Particular embodiments use a projector that uses separate modulators to simultaneously modulate red, green, and blue light or that uses a single modulator to sequentially modulate red, green, and blue light to generate an image. Filters or splitters may be used to split red, green, and blue light components from an arc lamp or other composite light source to provide the red, green, and blue light. According to particular embodiments, the filters or splitters cause both blue light and infrared light to be directed to a separate blue light modulator or to simultaneously direct both blue light and infrared light to a sequential modulator. For example, a band stop filter may be used to pass blue light, toward one end of the visible spectrum, and infrared light beyond an opposite end of the visible spectrum, while blocking red and green light components. The blue light modulator or a blue modulation phase of the sequential modulator may be used to generate one or more infrared images to represent heat-generating targets as well as to generate a blue portion of the image.

The one or more infrared images generated may have a visible blue light component because the infrared light component is collectively modulated with the blue light component. However, sensitivity of the human eye to blue light may be significantly less than the sensitivity of the human eye to red light or green light. Furthermore, the naturally-occurring nighttime environment does not include enough energy to stimulate the blue receptors of the eye. The visible blue light portion of the one or more infrared images may be difficult to visually detect without the use of night vision goggles (NVGs). Thus, any visible blue portion of the image created by using a common modulator for the blue and near-IR light may not undermine the realism of the simulation. Further, a shutter wheel that may continually pass infrared light while blocking visible light components may further reduce the brightness of the blue portion of the one or more images.

In a particular embodiment, a method includes receiving a video signal. The video signal may be configured to generate a viewable image substantially within a human visible spectrum. The video signal may include one or more of a red component, a green component, and a blue component. The video signal may also be configured to generate one or more infrared images. The one or more infrared images may be substantially outside the human visible spectrum and may have an infrared component detectable by a night vision device. In response to the video signal, the red and green components may be separately modulated to generate red and green portions of the viewable image. The blue component and the infrared component may be collectively modulated to generate a blue portion of the viewable image and the one or more infrared images.

In another particular embodiment, an apparatus may project a composite image including one or more infrared images. A first light modulator may be configured to collectively modulate a blue light component and an infrared light component. A controller may be operably coupled to the first light modulator. The controller may be configured to generate a signal that may cause the first light modulator to collectively modulate the infrared light component and the blue light component to generate the one or more infrared images and a blue portion of the composite image.

In still another particular embodiment, a flight simulator system may include a plurality of simulated flight controls. An image generation system may be configured to generate a video signal depicting a scene shown from a perspective from a pilot seat of a simulated aircraft. The image generation system may be configured to modify the video signal at least partially in response to input received via the simulated flight controls. A projector may be configured to generate a composite image of the scene from the video signal. The composite image may include one or more of a red portion, a green portion, and a blue portion substantially within a human visible spectrum. The composite image also may include one or more infrared images substantially outside the visible human spectrum that may be detectable by a night vision device. The one or more infrared images may be generated using a first modulator configured to simultaneously modulate an infrared component to generate the one or more infrared images and a blue light component to generate a blue portion of the basic image.

The features, functions, and advantages that are described can be achieved independently in various embodiments or may be combined in yet other embodiments, further details of which are disclosed with reference to the following description and drawings.

BRIEF DESCRIPTION OF THE DRAWINGS

FIG. 4 is a graph of transmission characteristics of a particular embodiment of a band stop filter that may be used in the projectors of FIGS. 1, 2, and 3;

FIG. 5 is diagram of a particular embodiment of a shutter wheel to enhance contrast of infrared objects in the projectors of FIGS. 1, 2, and 3;

DETAILED DESCRIPTION

Particular embodiments of the disclosure may present infrared images detectable by night vision devices but that are substantially outside a human visible spectrum. Filters or splitters may be used to split red, green, and blue light components from an arc lamp or another composite light source to provide the red, green, and blue light. According to particular embodiments, the filters or splitters may cause both blue light and infrared light to be directed to a separate blue light modulator or to simultaneously direct both blue light and infrared light to a sequential modulator. The blue light modulator or a blue modulation phase of the sequential modulator may be used to generate one or more infrared images to represent heat-generating targets as well as to generate a blue portion of a composite image.

Figure 1:
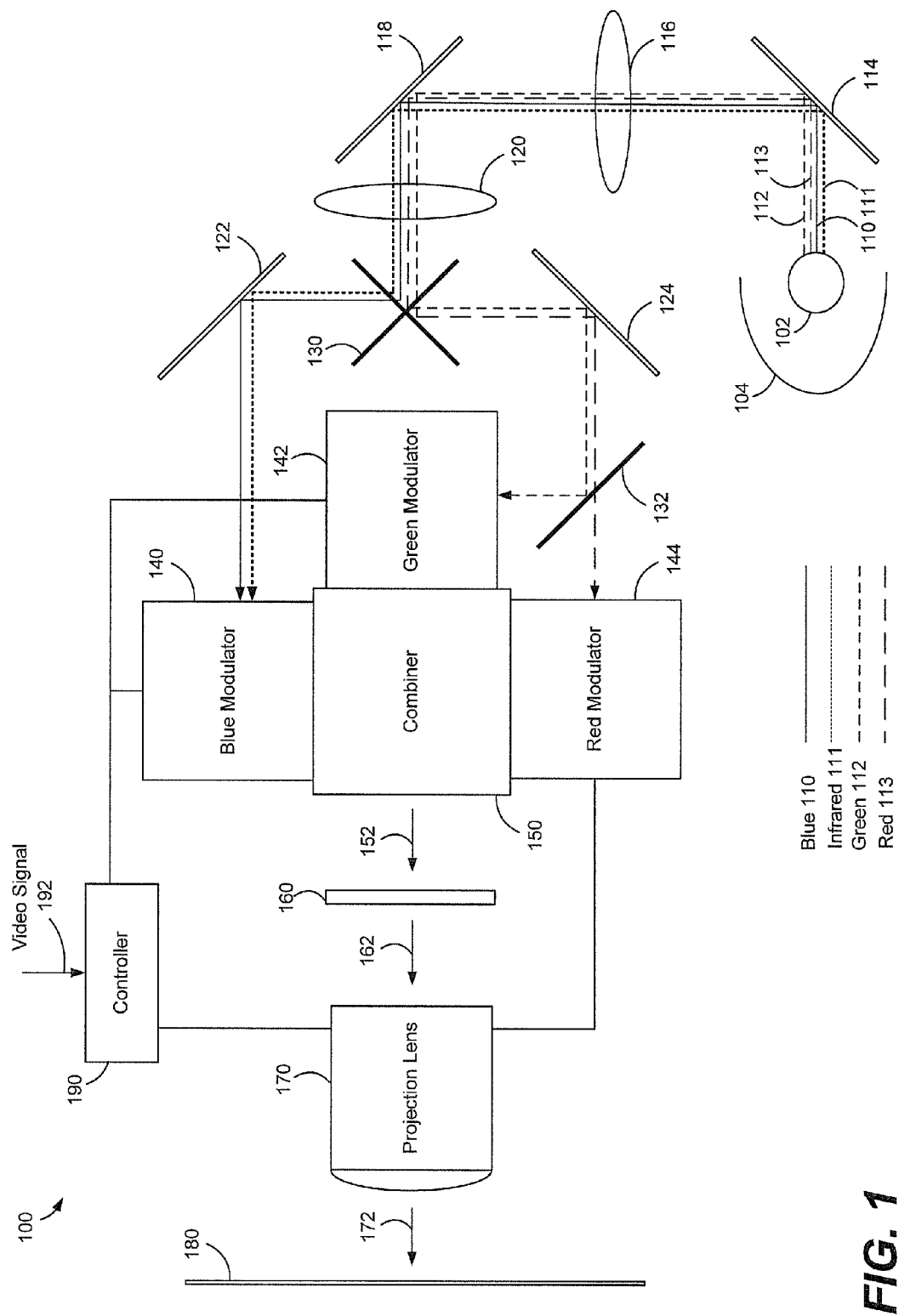
FIG. 1 is a block diagram of a particular embodiment of a video projector having separate light modulators configured to project human visible spectrum images and infrared images.

FIG. 1 is a block diagram of a particular embodiment of a video projector 100 having separate light modulators 140, 142, and 144 that may be configured to project human visible spectrum images and infrared images. The separate light modulators 140, 142, and 144 may operate under direction of a controller 190 that directs the light modulators 140, 142, and 144 in response to a video signal 192. The projector 100 may include a composite light source 102, a plurality of mirrors 104, 114, 118, 122, and 124, and a pair of collimators 116 and 120. The projector 100 also may include splitters 130 and 132 to selectively pass light components 110-113 to the separate light modulators 140, 142, and 144. Modulated light may be collected by a combiner 150 and passed through a shutter wheel 160 to a projection lens 170 that projects images on a projection screen 180.

The composite light source 102 may include an arc lamp or another source of composite light, including a blue light component 110, an infrared light component 111, a green light component 112, and a red light component 113. A first mirror 104 may include a parabolic reflector to reflect and focus the light components 110-113 generated by the composite light source 102 toward a first planar mirror 114. The first planar mirror 114 may redirect the light components 110-113 through a first collimator 116 toward a second planar mirror 118. The second planar mirror 118 may redirect the light components 110-113 through a second collimator 120 toward a first splitter 130. In a particular embodiment, the first splitter 130, a second splitter 132, or both, may be a filter rather than a splitter. However, for ease of reference, only the term "splitter" is used herein unless aspects particularly related to filters are being discussed in a particular context.

The first splitter 130 may separate the blue light component 110 and the infrared light component 111 from the red light component 113 and the green light component 112. The first splitter 130 may include a band stop filter that passes the blue light component 110 and the infrared light component 111 while blocking or redirecting the red light component 113 and the green light component 112. Operation of such a band stop filter is further described below with reference to FIG. 3. The first splitter 130 may direct the blue light component 110 and the infrared light component 111 toward a third planar mirror 122. The third planar mirror 122 may direct the blue light component 110 and the infrared light component 111 to a blue light modulator 140. In a particular embodiment, the modulators 140, 142, and 144 may include transmissive modulators, such as liquid crystal display (LCD) modulators that receive an input light signal at a first side and pass a modulated light signal at a second side, or reflective modulators, such as a liquid crystal on silicon (LCOS) modulators.

The first splitter 130 may direct the red light component 113 and the green light component 112 toward a fourth planar mirror 124. The fourth planar mirror 124 may direct the red light component 113 and the green light component 112 toward the second splitter 132. The second splitter 132 may pass the red light component 113 to a red light modulator 144 and may direct the green light component 112 toward a green light modulator 142. The light modulators 140, 142, and 144 may modulate respective light components under direction of the controller 190. Thus, while the red light modulator 144 may separately modulate the red light component 113 and the green light modulator 142 may separately modulate the green light component 112, the blue light modulator 140 may collectively modulate both the blue light component 110 and the infrared light component 111.

The modulated light (not shown in FIG. 1) received from the light modulators 140, 142, and 144 may be combined at the combiner 150 to generate a composite modulated light beam 152. The composite modulated light beam 152 may be presented to a shutter wheel 160. The shutter wheel 160 may be a rotatable wheel that includes one or more regions that repeatedly (e.g., intermittently) and simultaneously block portions of the composite beam 152 in a human visible spectrum, such as portions of the composite beam 152 that include modulated blue light, green light, and red light (not shown in FIG. 1). Repeatedly blocking the portions of the composite beam 152 in the human visible spectrum may reduce motion blur in portions of the projected images in the human visible spectrum.

In a particular embodiment, the one or more regions of the shutter wheel 160 that block the light components 110, 112, and 113 in the human visible spectrum may pass an infrared light portion of the composite beam 152 to increase the brightness of infrared images included in the composite beam 152. Because modulated infrared light portions of the composite beam 152 are not blocked by the shutter wheel 160, the infrared images may be affected by motion blur. However, infrared images that are detected by night vision goggles (NVGs) or other night vision devices (not shown in FIG. 1) may be slightly blurred by the nature of the infrared sources and by night vision technology, so any blurriness in the infrared images resulting from motion blur may be acceptable. The shutter wheel 160 is further described with reference to FIG. 5.

A shuttered composite beam 162 may be presented to the projection lens 170. The projection lens 170 may focus the shuttered composite beam 162 onto a projection screen 180 as a focused beam 172. The projection screen 180 may be a front-projection screen where a viewer sits on a same side of the projection screen 180 as the video projector 100. Alternatively, the projection screen 180 may be a rear-projection screen where a viewer sits on an opposite side of the projection screen 180 as the video projector 100. The controller 190 of the video projector 100 or another system in communication with the controller 190 or the light modulators 140, 142, and 144 (not shown in FIG. 1) may project an image that is reversed left-to-right for projection on a rear-projection screen so that the images may be viewed in an appropriate orientation.

The images projected on the projection screen 180 may include a basic image in a human visible spectrum (e.g., an image including red, green, and/or blue portions) as well as one or more infrared images substantially outside a human visible spectrum. The one or more infrared images may be detected through the use of NVGs or other night vision devices.

Figure 2:
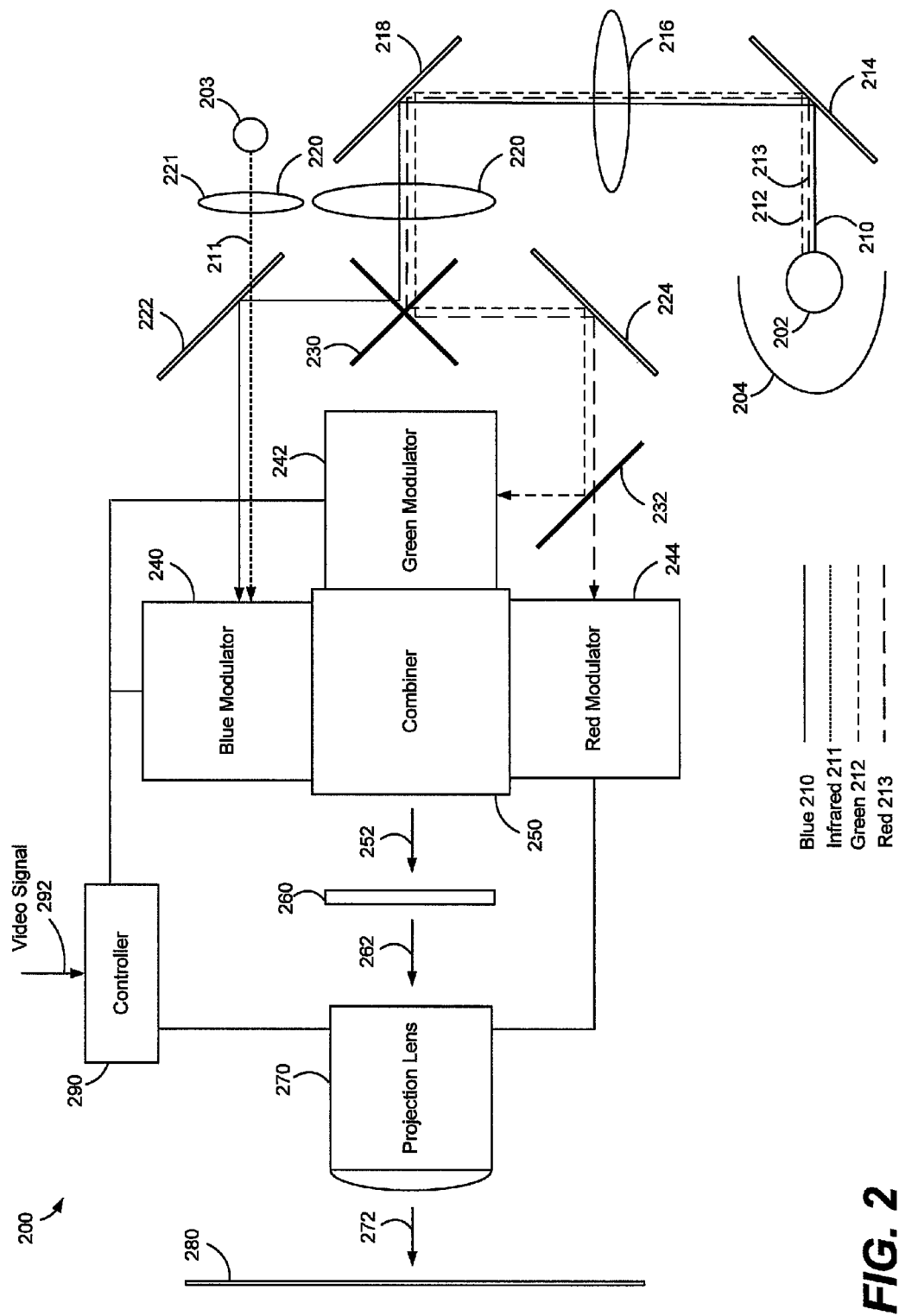
FIG. 2 is a block diagram of a particular embodiment of a video projector having separate light modulators and a separate near infrared light source configured to project human visible spectrum images and infrared images.

FIG. 2 is a block diagram of another particular embodiment of a video projector 200. The video projector 200 is similar to the video projector 100 of FIG. 1 in that the video projector 200 includes separate light modulators 240, 242, and 244 that may be configured to project human visible spectrum images and infrared images. The separate light modulators 240, 242, and 244 may operate under direction of a controller 290 that directs the light modulators 240, 242, and 244 in response to a video signal 292. The projector 200 also a plurality of mirrors 204, 214, 218, 222, and 224, and collimators 216 and 220. The projector 200 also may include splitters 230 and 232 to selectively pass light components 210, 212, and 213 to the separate light modulators 240, 242, and 244. Modulated light may be collected by a combiner 250 to present a composite modulated light beam 252 that is and passed through a shutter wheel 260 to generate a shuttered composite light beam 262. The shuttered composite light beam 262 is presented to a projection lens 270 that presents a focused composite beam 272 that projects images on a projection screen 280. The operation of the video projector 200 is similar to the operation of the video projector 100, and components in FIGS. 1 and 2 having reference numerals with the same two less significant digits perform similar functions.

In contrast to the video projector 100 of FIG. 1, however, instead of including a composite light source 102 that generates blue light 110, infrared light 111, green light 112, and red light 113, the video projector 200 includes a composite light source 202 that generates blue light 210, green light 212, and red light 213, and a separate infrared or near infrared light source 203. The near-infrared light source 203 may include, for example, an infrared or near-infrared light-emitting diode (LED) that generates infrared or near-infrared light 211. Because of the sensitivity of night vision devices (not shown in FIG. 2) to infrared light or near-infrared light, the source 203 may be a small, low power infrared or near-infrared (hereinafter referenced collectively as infrared light) LED.

Because the infrared light 211 is generated by a separate infrared light source 203, the infrared light is not reflected by the mirrors 214 or 218, collimated by the collimators 216 and 220, or separated by the splitter 230. Instead, the infrared light 211 is separately presented to the blue modulator 240. The infrared light 211 may be collimated by a collimator 221 and presented directly to the blue modulator 240. Alternatively, the infrared light 211 may pass through the mirror 222 where the mirror is coated so as to enable the infrared light 211 to pass through coatings on the mirror 222 while still reflecting the blue light 210 extracted and redirected by the splitter 230.

Except for the differences between the video projector 100 of FIG. 1 and the video projector 200 of FIG. 2 specifically described in the foregoing paragraphs, the operation of the video projectors 100 and 200 is comparable.

Figure 3:
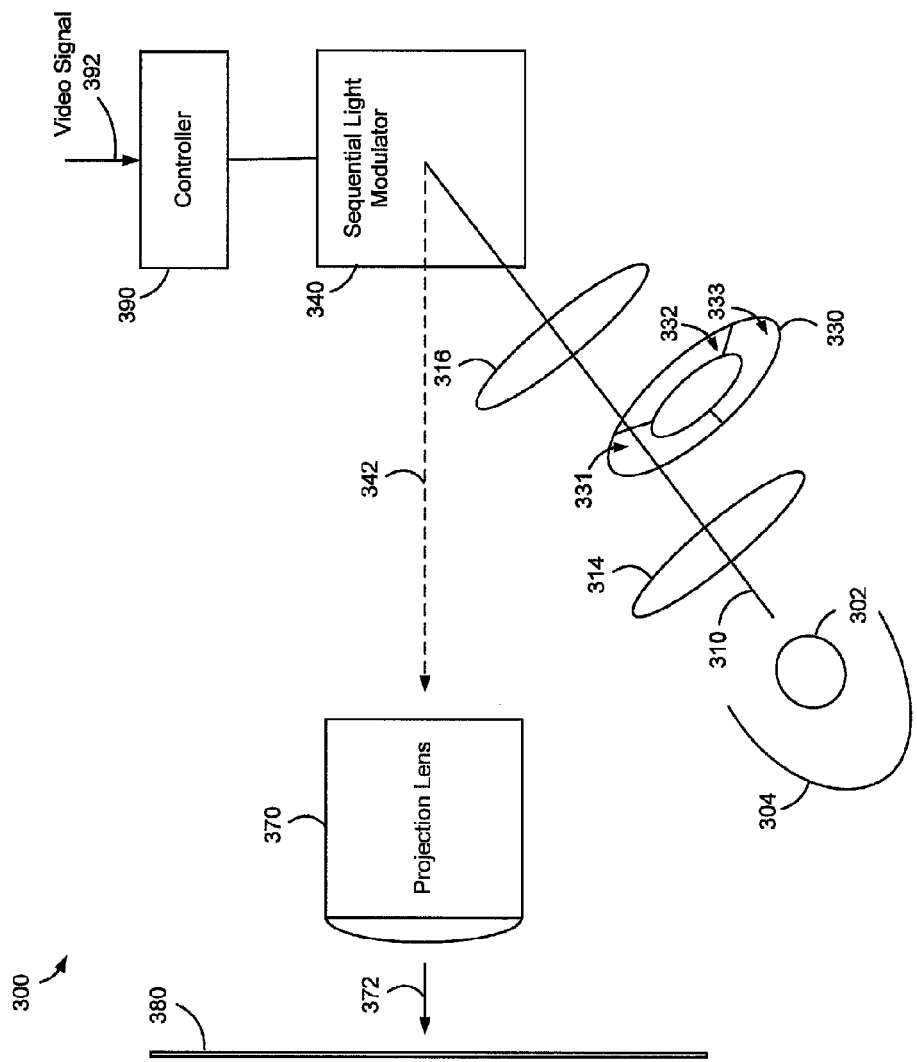
FIG. 3 is a block diagram of a particular embodiment of a video projector having a sequential light modulator configured to project human visible spectrum images and infrared images.

FIG. 3 is a block diagram of a particular embodiment of a projector 300 having a sequential light modulator 340 configured to project human visible spectrum images and infrared images. The sequential light modulator 340 operates under direction of a controller 390 that directs the sequential light modulator 340 in response to a video signal 392. The projector 300 includes a composite light source 302, a parabolic reflector 304, a sequential splitter 330, and a pair of collimators 314 and 316. Modulated light from the sequential light modulator 340 may be passed to a projection lens 370 that projects images on a projection screen 380.

The composite light source 302 may include an arc lamp or another source of composite light 310 that includes a blue light component, an infrared light component, a green light component, and a red light component (not shown in FIG. 3). The parabolic reflector 304 may reflect and focus the composite light 310 generated by the composite light source 302 through a first collimator 314 toward the sequential splitter 330. The sequential splitter 330 may include a rotating wheel that has a plurality of regions 331-333. Each of the regions 331-333 may selectively pass one or more selected components of the composite light 310 while blocking other components of the composite light 310. For example, a first region 331 may pass a red light component (not shown in FIG. 3) of the composite light 310 while blocking other light components. A second region 332 may pass a green light component (not shown in FIG. 3) of the composite light 310 while blocking other light components. A third region 333 may pass a blue light component and an infrared light component (not shown in FIG. 3) of the composite light 310 while blocking other light components. The third region 333 may include a band stop filter as further described with reference to FIG. 3.

The light component(s) allowed to pass by the sequential splitter 330 at a particular time may pass through a second collimator 316 to the sequential light modulator 340. The sequential light modulator 340 may include a reflective modulator, such as a digital light processing (DLP) device that includes a plurality of mirrors that are selectively activated to reflect impinging light to modulate the impinging light. Thus, rapid reconfiguration of the mirrors may be used to generate the modulated light 342. The sequential light modulator 340 may sequentially cycle through a red modulation phase, a green modulation phase, and a blue/infrared modulation phase. The sequential splitter 330 may sequentially pass selected light components to the sequential light modulator 340 in synchronization with the respective modulation phases. Although the modulated light 342 includes sequential signals comprised of different light components, the sequential splitting and modulation of the selected light components occurs so rapidly that they appear to a human eye to be a composite image including all the light components.

Specifically, as the first region 331 of the sequential splitter 330 passes a red light component to the sequential light modulator 340 during a red modulation phase, the sequential light modulator 340 modulates the impinging red light to generate a red portion of the image included in the modulated light 342. As the second region 332 of the sequential splitter 330 passes a green light component to the sequential light modulator 340 during a green modulation phase, the sequential light modulator 340 modulates the impinging green light to generate a green portion of the image included in the modulated light 342. As the third region 333 of the sequential splitter 330 passes both the blue light component and an infrared light component to the sequential light modulator 340 during the blue/infrared modulation phase, the sequential light modulator 340 modulates the impinging blue and infrared light to generate a blue portion of the image and one or more infrared images included in the modulated light 342.

The modulated light 342 may be passed to the projection lens 370. The projection lens 370 may focus the modulated light 342 onto a projection screen 380 as focused light 372. The projection screen 380 may be a front-projection screen or a rear-projection screen as previously described with reference to FIGS. 1 and 2. The images projected on the projection screen 380 may include a basic image in a human visible spectrum (e.g., including red, green, and blue portions) as well as one or more infrared images substantially outside a human visible spectrum. The one or more infrared images may be detected through the use of NVGs or other night vision devices.

FIG. 4 is a graph 400 of transmission characteristics of a particular embodiment of a band stop filter that may be used in the projectors 100 and 300 of FIGS. 1 and 3, respectively. As previously described, the projector 100 of FIG. 1 may include a first splitter 130 that passes a blue light component 110 and an infrared light component 111. The projector 300 of FIG. 3 may include a sequential splitter 330 that includes a third region 333 that passes a blue light component and an infrared component of composite light 310. The first splitter 130 and the third region 333 of the sequential splitter 330 may include a band stop filter configured to pass blue light, at one end of a human visible spectrum, and infrared light at an opposite end of the human visible spectrum.

The graph 400 plots wavelengths in nanometers on an independent axis 402 versus transmission percentage on a dependent axis 404. An exemplary band stop filter having transmission characteristics 420 as described in the graph 400 may transmit approximately 90 percent of light having wavelengths up to approximately 500 nanometers 430, which would include a blue portion of the human visible spectrum. The band stop filter also may transmit approximately 90 percent or more of light having wavelengths in excess of 700 nanometers 440, which would include an infrared portion of the spectrum. The band stop filter may substantially block light having wavelengths in a band between about 500 nanometers 430 and about 700 nanometers 440, which would include green and red portions of the human spectrum. Thus, the band stop filter stops light in a band of wavelengths between about 500 nanometers 430 and about 700 nanometers 440. Using such a band stop filter as the first splitter 130 of FIG. 1 or the third region 333 of the sequential splitter 330 of FIG. 3 enables both a blue light component and an infrared light component to be collectively passed to a blue light modulator 140 or a sequential light modulator 340, respectively, to be collectively modulated.

Collective modulation of the blue light component and the infrared light component may exploit the relatively low sensitivity of the human eye to blue light. Sensitivity of the human eye to blue light is significantly less than the sensitivity of the human eye to red light or green light. Thus, although the infrared images may have a corresponding blue image in the human visible spectrum, the human eye may not easily detect the blue portion of the image. Thus, the one or more infrared images may be difficult to visually detect without the use of night vision goggles (NVGs). The blue portion of the infrared images thus may not undermine the realism of the simulation.

FIG. 5 is diagram of a particular embodiment of a shutter wheel 500. The shutter wheel 500 may be used in any of the projectors of FIGS. 1, 2, and 3. The shutter wheel 500 may be used to sequentially block visible light images to reduce motion blur that may result from various modulation technologies, such as described with reference to the shutter wheels 160 and 260 of FIGS. 1 and 2, respectively.

The shutter wheel 500 may include first regions 510 and second regions 520 placed alternately around a periphery of the shutter wheel 500. The first regions 510 may pass substantially all light of a composite light signal, including a red light portion, a green light portion, a blue light portion, and an infrared light portion. In a particular embodiment, the second regions 520 may substantially block all light portions of the composite light signal except for the infrared light portions. For example, the second regions 520 may include a band pass filter that substantially transmits light having wavelengths over 700 nanometers, which includes infrared light. The band pass filter may substantially block light having a wavelength below 700 nanometers, including all human visible light.

As the shutter wheel 500 is rotated through a light beam, such as the composite beams 152 and 252 of FIGS. 1 and 2, when the light beam intersects one of the first regions 510, substantially all light portions of the light beam are able to pass through the shutter wheel 500. In contrast, when the light beam intersects one of the second regions 520, only the infrared portion of the light beam is able to pass through the shutter wheel 500. Thus, the shutter wheel 500 substantially continuously and substantially passes the infrared portion of the light beam while sequentially blocking the visible portions of the light beam.

Sequentially blocking the visible portions of the light beam may reduce brightness of the visible portions of the light beam. Continually passing the infrared portions of the light beam may improve the contrast of the infrared portions of the image, which may be detectable by NVGs or other night vision devices. At the same time, sequential blocking of the blue portion (and other visible portions) of the light beam may diminish brightness of the visible blue portion of the infrared images that may result from the collective modulation of the blue light and infrared light components. Reducing brightness of a visible component of the one or more infrared images may improve realism of a night simulation because it may require use of NVGs or another night vision device to detect the one or more infrared images. Although continually passing the one or more infrared images may permit motion blur in the one or more infrared images, infrared-generating sources and night vision technology may naturally result in some blurriness of infrared-generating sources. Thus, some motion blur may be substantially unnoticeable or may acceptable.

It also should be noted that, because the shutter wheel 500 sequentially blocks visible portions of the light beam, the shutter wheel 500 may aid in preventing motion blur in visible portions of an image. Thus, the shutter wheel 500 may be used in projecting day-time scenes (which may not include infrared images) or night-time scenes. Thus, the shutter wheel 500 may be left in place for all uses, without being switched depending on whether day-time or night-time scenes is to be projected.

Figure 6:
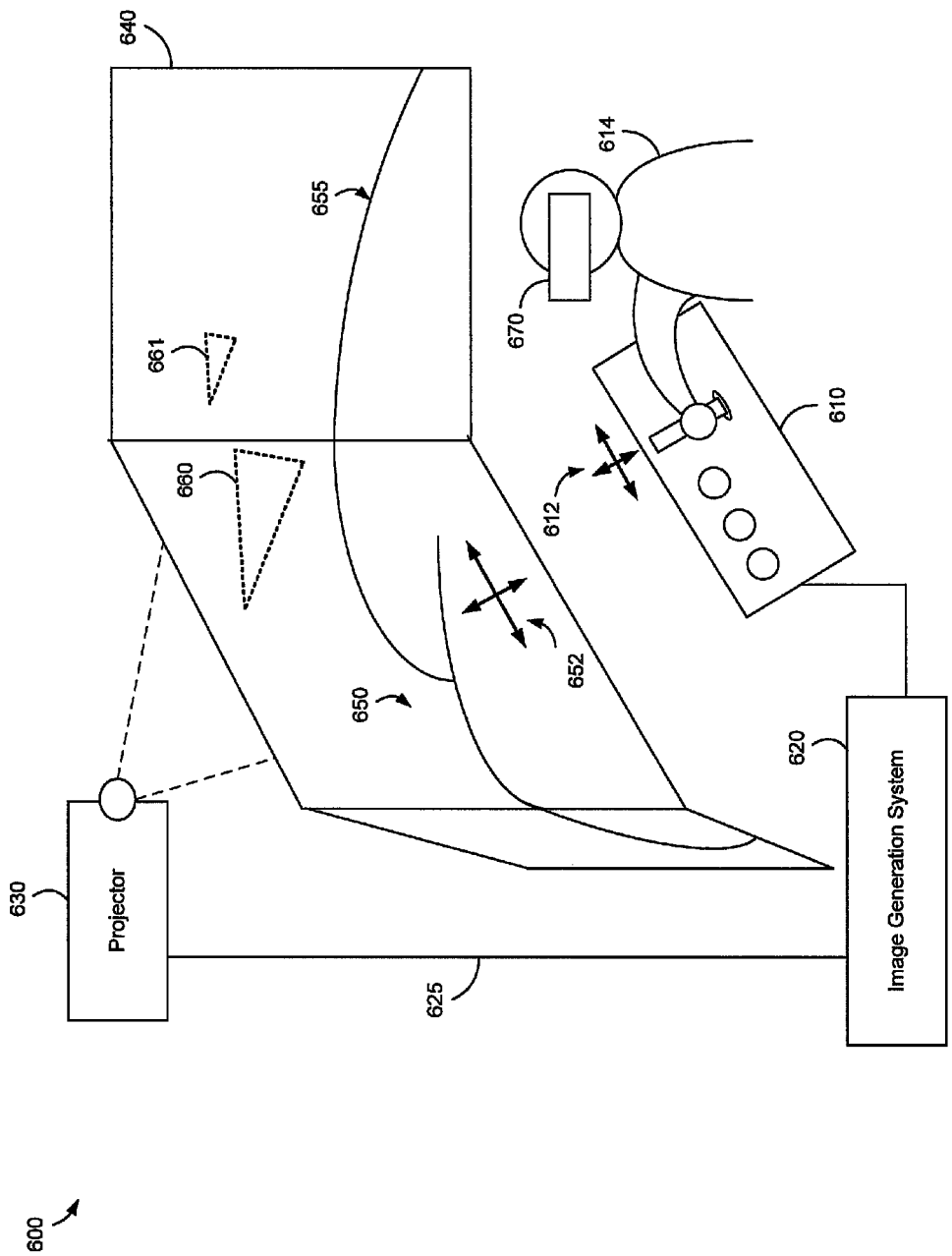
FIG. 6 is a perspective diagram of a particular embodiment of a flight simulator configured to project infrared images using a projector as described with reference to FIGS. 1, 2, and 3.

FIG. 6 is a perspective diagram of a particular embodiment of a flight simulator 600 configured to project images 650, including one or more infrared images 660 and 661, using a projector 630. A single projector 630 projecting the images 650 on a projection screen 640 is shown in FIG. 6; however, in some embodiments the flight simulator 600 may include more than one projector. For example, multiple projectors may be used to project different parts of the images 650 on different projection screens. The flight simulator 600 may include a plurality of simulated controls 610. The flight simulator 600 also may include an image generation system 620. In a particular embodiment, the projector 630 is one of the projectors 100, 200, and 300 as described with reference to FIGS. 1, 2, and 3, respectively.

A user 614 may operate the plurality of simulated controls 610. User inputs received via the plurality of simulated controls 610 may be presented to the image generation system 620. In response to the user input 612, the image generation system 620 may cause changes 652 in images 650 projected by the projector 630 on the screen 640. Thus, for example, a user input 612 indicating an intent to steer to the left may cause the image generation system 620 to change a video signal 625 presented to the projector 630. The projector 630 then may project images 650 that simulate the scene as result of steering to the left.

In the example of FIG. 6, the flight simulator 600 may be used to present a night-time scene. For example, the images 650 projected on the projection screen 640 may include a basic image 655 in a human visible spectrum. The basic image 655 may include red, green, and blue light components generated by the projector 630. For purposes of illustration, the basic image 655 is represented in solid lines in FIG. 6. The images 650 may also include the one or more infrared images 660 and 661. For purposes of illustration, the one or more infrared images 660 and 661 are represented in dashed lines in FIG. 6. The user 614 may use a night vision device, such as night vision goggles (NVGs) 670, to enable the user 614 to detect the one or more infrared images 660 and 661. As previously described with reference to FIGS. 1-5, although the one or more infrared images 660 and 661 may have a visible blue component, the visible blue component may be difficult to detect. Thus, the user 614 may not be able to detect the one or more infrared images 660 and 661 without the NVGs, adding to the realism of the simulation provided by the flight simulator 600 during simulation of a night mission.

Figure 7:
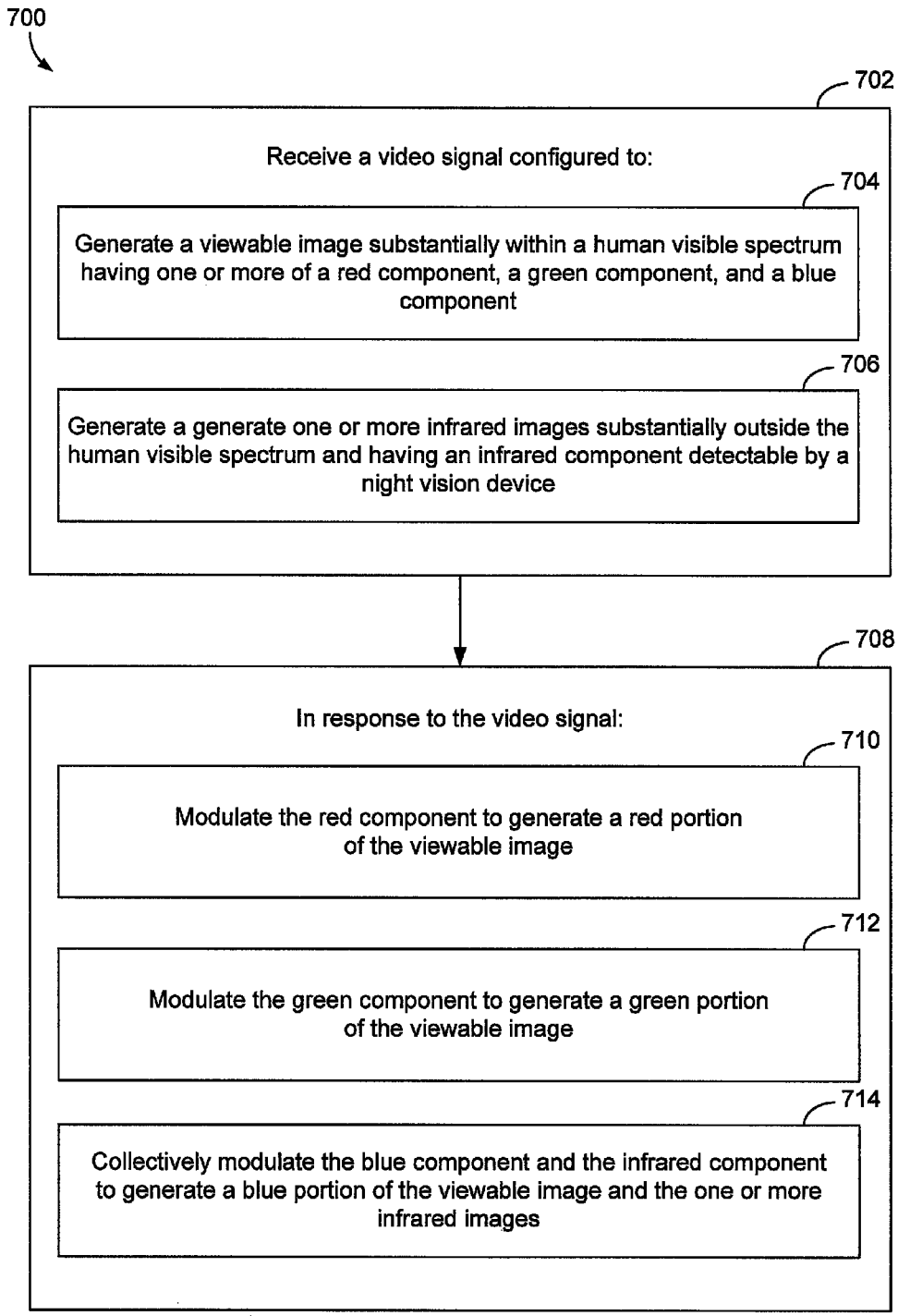
FIG. 7 is a flow diagram of a particular embodiment of a method of projecting infrared images.

FIG. 7 is a flow diagram of a particular embodiment of a method 700 of projecting infrared images. A video signal may be received, at 702. For example, the video signal may be received by one of the projectors 100, 200, and 300 as described with reference to FIGS. 1, 2, and 3, respectively. The video signal may be configured to generate a viewable image substantially within a human visible spectrum having one or more of a red component, a green component, and a blue component, at 704. The video signal may also be configured to generate one or more infrared images substantially outside the human visible spectrum and having an infrared component detectable by a night vision device, at 706.

Light may be modulated in response to the video signal, at 708. For example, a red component of light may be modulated to generate a red portion of the viewable image, at 710, and a green component of light may be modulated to generate a green portion of the viewable image, at 712. As described with reference to FIGS. 1-3, the red and green portions of an image within a human visible spectrum may be generated by separately modulating red and green components of light. The red component may be modulated by separate red light modulators 144 and 244, as in FIGS. 1 and 2, or separately modulated by a sequential light modulator 340 as in FIG. 3. Similarly, the green component may be modulated by separate green light modulators 142 and 242, as in FIGS. 1 and 2, or separately modulated by a sequential light modulator 340 as in FIG. 3. A blue component and an infrared component may be collectively modulated to generate the blue portion of the image and the one or more infrared images, at 714. As previously described, the blue component and the infrared component may be collectively passed to separate blue light modulators 140 and 240, as in FIGS. 1 and 2, or the blue light component and the infrared light component may be collectively passed to the sequential light modulator 340, as in FIG. 3. The blue light modulators 140 and 240 or the sequential light modulator 340 may collectively modulate the blue component and the infrared component to generate the blue portion of the viewable image and the one or more infrared images.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
    receiving a video signal configured to:
        generate a viewable image substantially within a human visible spectrum having one or more of a red component, a green component, and a blue component; and
        generate one or more infrared images substantially outside the human visible spectrum and having an infrared component detectable by a night vision device; and
    in response to the video signal:
        modulating the red component to generate a red portion of the viewable image;
        modulating the green component to generate a green portion of the viewable image; and
        collectively modulating the blue component and the infrared component to generate a blue portion of the viewable image and the one or more infrared images.

2. The method of claim 1, further comprising:
    receiving composite light from a composite light source configured to generate the red component, the green component, the blue component, and the infrared component;
    splitting the red component from the composite light;
    splitting the green component from the composite light; and
    splitting the blue component and the infrared component from the composite light.

3. The method of claim 2, further comprising passing the composite light from the composite light source through a band stop filter, wherein the band stop filter substantially transmits the infrared component and the blue component and substantially blocks the red component and the green component.

4. The method of claim 1, further comprising:
receiving the red component, the green component, and the blue component from a first light source; and
receiving the infrared component from a second light source.

5. The method of claim 1, wherein the red component, the green component, and a combination of the blue component and the infrared component are one of:
sequentially modulated by a single reflective modulator; and
simultaneously modulated by a plurality of one of separate transmissive modulators and separate reflective modulators.

6. The method of claim 1, further comprising:
combining the red portion, the green portion, the blue portion, and the one or more infrared images into a composite image beam; and
projecting the composite image beam.

7. The method of claim 6, wherein the composite image beam is projected through a shutter that substantially transmits the one or more infrared images while intermittently and substantially blocking the red portion, the green portion, and the blue portion.

8. The method of claim 7, wherein the shutter includes a rotatable wheel, wherein the rotatable wheel includes a first plurality of regions alternating with a second plurality of regions around a periphery of the rotatable wheel, wherein:
the first plurality of regions substantially passes the one or more infrared images and substantially blocks the red portion, the green portion, and the blue portion; and
the second plurality of regions substantially passes the red portion, the green portion, the blue portion, and the one or more infrared images.

9. The method of claim 1, wherein the video signal is generated by a flight simulator, wherein the viewable image represents a scene shown from a perspective from a pilot seat of a simulated aircraft, and wherein the viewable image is changed in response to inputs received at a plurality of simulated flight controls of the flight simulator.

10. The method of claim 9, wherein the viewable image represents a nighttime view of the scene and at least one of the one of more infrared images.

11. An apparatus for projecting a composite image including one or more infrared images, the apparatus comprising:
a first light modulator configured to collectively modulate a blue light component and an infrared light component; and
a controller operably coupled to the first light modulator, wherein the controller is configured to generate a signal that causes the first light modulator to collectively modulate the infrared light component and the blue light component to generate the one or more infrared images and a blue portion of the composite image.

12. The apparatus of claim 11, further comprising one or more light sources configured to generate a plurality of light components including the blue light component, the infrared light component, a red light component, and a green light component.

13. The apparatus of claim 12, further comprising one or more splitters, the one or more splitters configured to:
receive the plurality of light components from a composite light source; and
split from the plurality of light components the red light component, the green light component, and a combination of the infrared light component and the blue light component.

14. The apparatus of claim 13, wherein the one or more splitters include a band stop filter configured to substantially pass the combination of the infrared light component and the blue light component to the first light modulator and to substantially block others of the plurality of light components.

15. The apparatus of claim 13, further comprising:
a second light modulator configured to modulate the red light component to generate a red portion of the composite image; and
a third light modulator configured to modulate the green light component to generate a green portion of the composite image.

16. The apparatus of claim 15, further comprising a combiner and a projection lens, wherein the combiner is configured to receive the one or more infrared images, the blue portion of the composite image, the red portion of the composite image, and the green portion of the composite image to generate a composite image beam that is directed toward the projection lens.

17. The apparatus of claim 16, further comprising a rotatable shutter wheel configured to receive the composite image beam and to substantially pass the one or more infrared images while intermittently blocking the blue portion, the red portion, and the green portion of the composite image.

18. The apparatus of claim 11, further comprising a flight simulator including a plurality of simulated flight controls, wherein the controller is configured to modify the signal at least partially in response to input received via the simulated flight controls.

19. A flight simulator system comprising:
a plurality of simulated flight controls;
an image generation system configured to generate a video signal depicting a scene shown from a perspective from a pilot seat of a simulated aircraft, wherein the image generation system is configured to modify the video signal at least partially in response to input received via the simulated flight controls; and
a projector configured to generate a composite image of the scene from the video signal, wherein the composite image includes:
a basic image substantially within a human visible spectrum having one or more of a red portion, a green portion, and a blue portion; and
one or more infrared images substantially outside the visible human spectrum and detectable by a night vision device, wherein the one or more infrared images and the blue portion of the basic image are generated using a first modulator configured to simultaneously modulate an infrared component and a blue light component.

20. The flight simulator of claim 19, wherein the scene represents a nighttime view of an area and the one or more infrared images represent heat-generating objects situated within the area.

* * * * *